US009933836B2

(12) United States Patent
Allen-Ware et al.

(10) Patent No.: US 9,933,836 B2
(45) Date of Patent: *Apr. 3, 2018

(54) MANAGEMENT OF CORE POWER STATE TRANSITION IN A MICROPROCESSOR (71) Applicant: International Business Machines Corporation, Armonk, NY (US)

(72) Inventors: Malcolm S. Allen-Ware, Austin, TX (US); Charles R. Lefurgy, Austin, TX (US); Karthick Rajamani, Austin, TX (US); Todd J. Rosedahl, Zumbrota, MN (US); Guillermo J. Silva, Austin, TX (US); Gregory S. Still, Raleigh, NC (US); Victor Zyuban, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/833,335

(22) Filed: Aug. 24, 2015

(65) Prior Publication Data

US 2017/0031418 A1 Feb. 2, 2017

Related U.S. Application Data

(63) Continuation of application No. 14/814,901, filed on Jul. 31, 2015.

(51) Int. Cl.
*G06F 1/32* (2006.01)

(52) U.S. Cl.
CPC .......... *G06F 1/3243* (2013.01); *G06F 1/324* (2013.01); *G06F 1/3234* (2013.01);
(Continued)

(58) Field of Classification Search
CPC ...... G06F 1/3234; G06F 1/324; G06F 1/3243; G06F 1/3287; G06F 1/3296;
(Continued)

(56) References Cited

U.S. PATENT DOCUMENTS 6,823,516 B1 11/2004 Cooper
7,650,518 B2 1/2010 Allarey et al.
(Continued)

OTHER PUBLICATIONS

International Business Machines Corporation, "List of IBM Patents or Patent Applications Treated as Related," Sep. 21, 2015, 2 pages.
(Continued)

*Primary Examiner* — Abdelmoniem Elamin
(74) *Attorney, Agent, or Firm* — Patterson + Sheridan, LLP (57) ABSTRACT

A method for adjusting a frequency of a processor is disclosed herein. In one embodiment, the method includes inhibiting one or more processor cores from exiting an idle state. The method further includes determining a number of processor cores requesting exit from the idle state and a number of non-idle processor cores. The method also includes selecting a maximum frequency for the inhibited and non-idle processor cores based on the number of inhibited processor cores requesting exit from the idle state and the number of non-idle processor cores. The method includes setting the maximum frequency for both the inhibited and the non-idle processor cores, and then uninhibiting the processor cores requesting exit from the idle state.

9 Claims, 4 Drawing Sheets (52) U.S. Cl.
CPC .......... *G06F 1/3287* (2013.01); *G06F 1/3296* (2013.01); *Y02B 60/1217* (2013.01); *Y02B 60/1239* (2013.01); *Y02B 60/1282* (2013.01); *Y02B 60/1285* (2013.01)

(58) Field of Classification Search
CPC ............ Y02B 60/1217; Y02B 60/1239; Y02B 60/1282; Y02B 60/1285
See application file for complete search history.

(56) References Cited

U.S. PATENT DOCUMENTS

| | | |
|---|---|---|
| 7,900,069 B2 | 3/2011 | Allarey |
| 8,024,590 B2 | 9/2011 | Song et al. |
| 8,245,070 B2 | 8/2012 | Finkelstein et al. |
| 8,510,582 B2 | 8/2013 | Naffziger et al. |
| 8,560,869 B2 | 10/2013 | Allarey |
| 8,769,316 B2 | 7/2014 | Ananthakrishnan et al. |
| 8,775,833 B2 | 7/2014 | Ananthakrishnan et al. |
| 8,779,846 B2 | 7/2014 | Allen-Ware et al. |
| 8,869,152 B1 | 10/2014 | Abrishami et al. |
| 8,892,931 B2 | 11/2014 | Kruglick |
| 8,943,340 B2 | 1/2015 | Ananthakrishnan et al. |
| 8,959,369 B2 | 2/2015 | de Cesare et al. |
| 9,223,383 B2 * | 12/2015 | Manne ..................... G06F 1/324 |
| 9,280,172 B2 | 3/2016 | Allarey et al. |
| 9,335,813 B2 | 5/2016 | Burns et al. |
| 9,360,918 B2 * | 6/2016 | Manne .................. G06F 1/3234 |
| 9,372,803 B2 * | 6/2016 | Manne ................. G06F 12/0891 |
| 9,568,982 B1 | 2/2017 | Allen-Ware et al. |
| 9,588,823 B2 | 3/2017 | Rajappa et al. |
| 2005/0046400 A1 | 3/2005 | Rotem |
| 2006/0047987 A1 | 3/2006 | Prabhakaran et al. |
| 2008/0005592 A1 | 1/2008 | Allarey et al. |
| 2008/0104425 A1 | 5/2008 | Gunther et al. |
| 2008/0189569 A1 | 8/2008 | Chu |
| 2011/0320835 A1 | 12/2011 | Browning |
| 2012/0072746 A1 | 3/2012 | Sotomayor |
| 2012/0144215 A1 | 6/2012 | Naffziger et al. |
| 2012/0254643 A1 | 10/2012 | Fetzer et al. |
| 2013/0111226 A1 | 5/2013 | Ananthakrishnan et al. |
| 2013/0286026 A1 | 10/2013 | Kaburlasos et al. |
| 2014/0181413 A1 * | 6/2014 | Manne ................. G06F 12/0891 711/135 |
| 2014/0181537 A1 | 6/2014 | Manne et al. |
| 2014/0237272 A1 | 8/2014 | Sadowski |
| 2015/0355705 A1 | 12/2015 | Weissmann et al. |

OTHER PUBLICATIONS

U.S. Application entitled "Management of Core State Transition in a Microprocessor", filed Jul. 31, 2015.
U.S. Application entitled "Deterministic Current Based Frequency Optimization of Processor Chip", filed Jul. 31, 2015.
U.S. Application entitled "Deterministic Current Based Frequency Optimization of Processor Chip", filed Aug. 24, 2015.
U.S. Appl. No. 14/814,901, entitled Management of Core Power State Transition in a Microprocessor, filed Jul. 31, 2015.
IBM "List of IBM Patents or Patent Applications Treated As Related".
De Gelas, J., "Intel Xeon E5 Version 3: Up to 18 Haswell EP Cores", AnandTech, http://www.anandtech.com/print/8423/intel-xeon-e5-version-3-up-to-18-haswell-ep-cores, Sep. 8, 2014, 43 pages.
Jahagirdar, S., et al., "Power Management of the Third Generation Intel Core Micro Architecture formerly codenamed Ivy Bridge", Intel, Ivy Bridge—Hot Chips, 2012, 49 pages.
Rotem, E., et al., "Power management architecture of the 2nd generation Intel® Core TM microarchitecture, formerly codenamed Sandy Bridge", Intel, Sandy Bridge—Hot Chips, Aug. 2011, 33 pages.
U.S. Application entitled "Management of Core Power State Transition in a Microprocessor", filed Aug. 24, 2015.
Woligroski. D . "AM D's Kabini: Jaguar and GCN Come Together in a 15 W APU", May 23, 2013, 24 pages.

* cited by examiner

MANAGEMENT OF CORE POWER STATE TRANSITION IN A MICROPROCESSOR

CROSS-REFERENCE TO RELATED APPLICATIONS

This application is a continuation of U.S. patent application Ser. No. 14/814,901, filed Jul. 31, 2015, now U.S. Pat. No. 9,568,982. The aforementioned related patent application is herein incorporated by reference in its entirety.

This application is related to U.S. patent application Ser. No. 14/814,870, titled "Deterministic Current Based Frequency Optimization of Processor Chip," filed Jul. 31, 2015, the contents of which are incorporated herein by reference.

GOVERNMENT LICENSE RIGHTS

This invention was made with government support under contract number HR0011-13-C-0022 awarded by Defense Advanced Research Projects Agency (DARPA). The government has certain rights in the invention.

BACKGROUND

The present disclosure relates to a method for operating a processor, and more specifically, a method for adjusting a frequency of a processor.

In modern computer systems, an operating system may control a frequency selection for a processor to achieve energy savings or a performance boost. The operating system may also put cores of a multi-core processor to sleep and wake up those cores at a later time. The operating system may wake up a core at a time when the processor is running a high-power workload. When cores wake up during a high-power state, the processor may experience an overcurrent situation. However, the processor should stay within acceptable limits for power, operating voltage, temperature, and current in order to prevent shutdown or damage of components.

SUMMARY

According to one embodiment, a method for adjusting a frequency of a processor is disclosed herein. The method includes inhibiting one or more processor cores from exiting an idle state. The method further includes determining a number of processor cores requesting exit from the idle state and a number of non-idle processor cores. The method also includes selecting a maximum frequency for the inhibited and non-idle processor cores based on the number of inhibited processor cores requesting exit from the idle state and the number of non-idle processor cores. The method includes setting the maximum frequency for both the inhibited and the non-idle processor cores, and then uninhibiting the processor cores requesting exit from the idle state.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

For clarity, identical reference numerals have been used, where applicable, to designate identical elements that are common between figures. Additionally, elements of one embodiment may be adapted for use with other embodiments.

DETAILED DESCRIPTION

In embodiments described herein, one or more cores of a multi-core processor may be shut down or put into a low-power state during operation (known as an idle state). That is, unused cores may be put to sleep or into a low-power state by an operating system to save power, depending on the requirements of the workload. In some embodiments, frequency and/or voltage can be increased for the active cores when the unused cores are shut down. The operating system may wake up the unused cores at any time, and those unused cores would then begin operating at the higher voltage and/or frequency. However, operating at this higher power could lead to an overcurrent condition that exceeds the limits of a voltage regulator, or could create too much heat for the cooling system to handle. Therefore, embodiments of the present disclosure utilize an interlock to safely transition to new voltage/frequency states when processor cores exit an idle state. The interlock prevents cores from exiting an idle state until the frequency and/or voltage have been set to a safe level.

Figure 1:
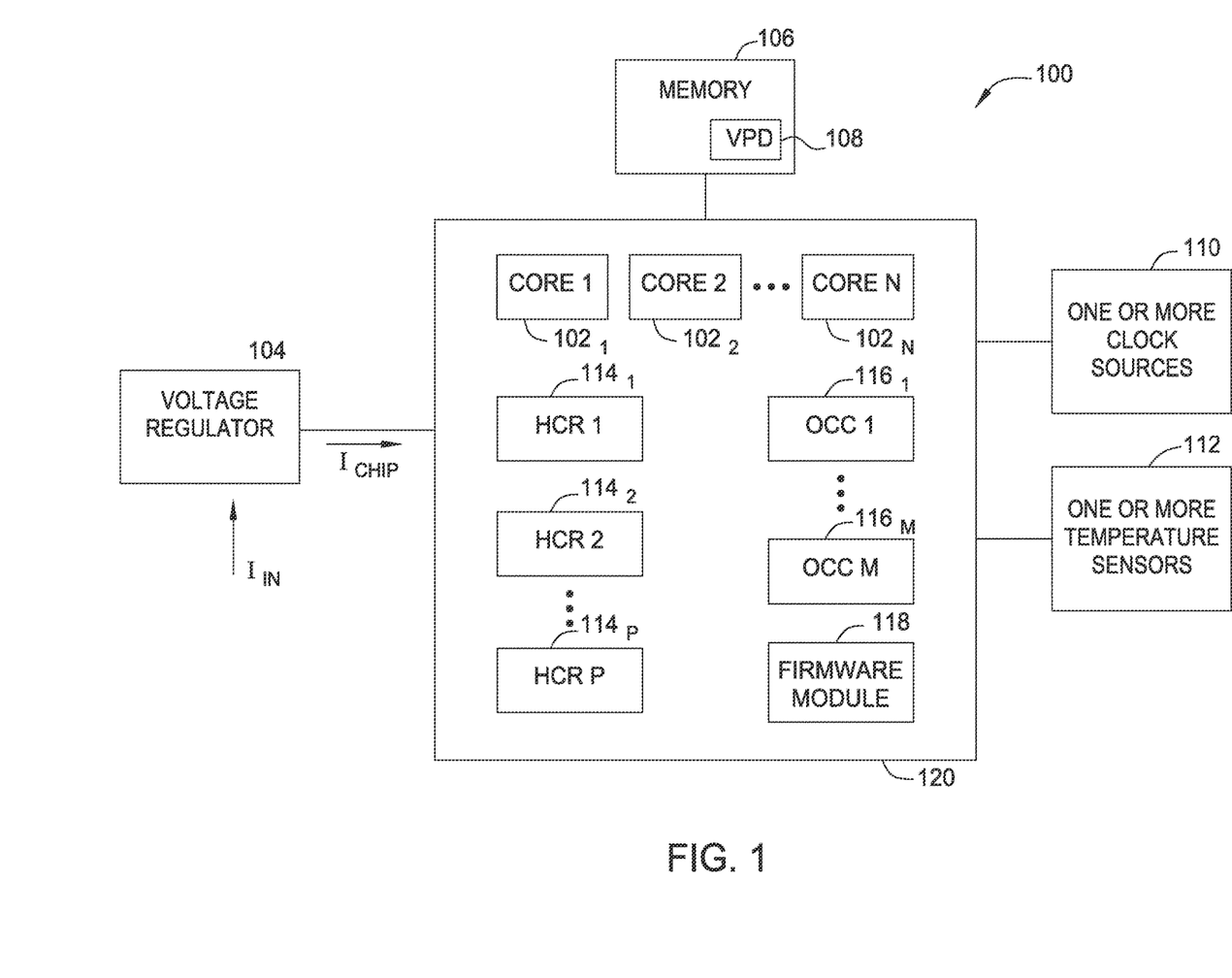
FIG. 1 illustrates a block diagram of a computer system, according to one embodiment disclosed herein.

FIG. 1 illustrates a computer system 100 according to one embodiment. The computer system 100 includes a chip 120 that includes one or more processor cores 102, shown as Core 1, Core 2, . . . , Core N. Embodiments described herein may utilize any number N of processor cores. In other embodiments, components of system 100 shown as on chip 120 may be located off the chip, and components of system 100 shown as off chip 120 may be located on the chip.

Computer system 100 further comprises a voltage regulator 104. Voltage regulator 104 provides power to chip 120. An input current $I_N$ to the voltage regulator 104 may be measured using any suitable mechanism. In addition, a current $I_{CHIP}$ from the voltage regulator 104 to the chip 120 may also be measured using any suitable mechanism.

Computer system 100 also comprises memory 106. Memory 106 may comprise a random access memory (RAM), a read-only memory (ROM), an erasable programmable read-only memory (EPROM or Flash memory), an optical storage device, a magnetic storage device, or any suitable combination of the foregoing. Vital product data (VPD) 108 may be stored in memory 106. VPD 108 may be stored on Serial Electrically Erasable Programmable Read Only Memory (SEEPROM) in one embodiment. VPD 108 is a collection of configurational and informational data associated with the chip.

Computer system 100 further comprises one or more clock sources 110 and one or more temperature sensors 112. Clock sources 110 are used to provide various clock signals to the chip 120. Temperature sensors 112 provide various temperature measurements associated with computer system 100. Any suitable number of temperatures sensors 112 may be used, and the temperatures sensors 112 may be any appropriate type of sensor.

Computer system 100 also comprises hardware control registers (HCR) 114. Embodiments described herein may utilize any number P of HCRs 114, and each HCR 114 may be any length. HCRs 114 store bits of information that can be read out or written. HCRs 114 may be used to store information about the status of certain components of computer system 100. As one example, an HCR 114 may store a bit for each processor core 102 that denotes whether each processor core 102 is currently active or idle. Another HCR 114 may comprise an interlock that stores a wakeup signal that denotes whether a core has been selected for exiting from an idle state. Firmware or other logic may be used to poll the interlock at regular intervals to check for pending wakeup signals for the idle cores. In other embodiments, an interrupt may be used to denote that a core has received a wakeup signal.

Computer system 100 may comprise one or more on-chip controllers (OCC) 116. Any number M of OCCs may be utilized. OCCs 116 may run firmware from firmware module 118 to perform various tasks for computer system 100. Certain steps of the embodiments described herein may be run or performed by an OCC 116 in conjunction with firmware from firmware module 118.

Figure 2:
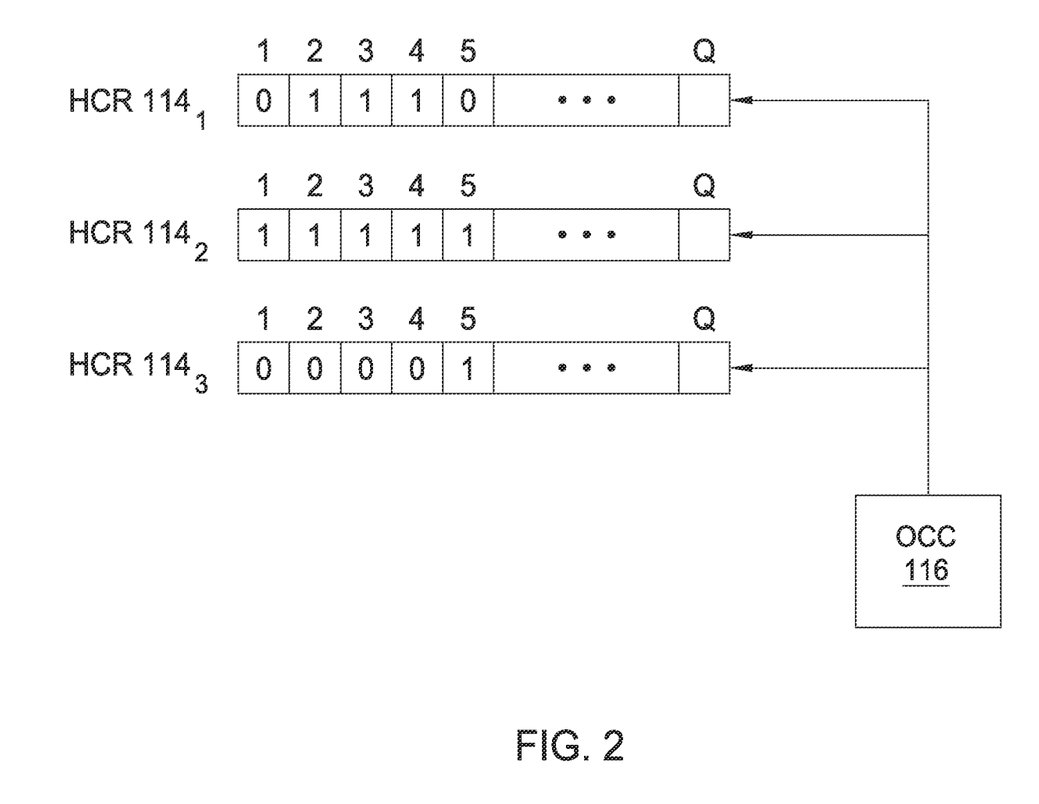
FIG. 2 illustrates example hardware control registers, according to one embodiment disclosed herein.

FIG. 2 illustrates example hardware control registers $114_1$, $114_2$, and $114_3$, each of length Q. In this example embodiment, HCR $114_1$ stores the current status of each processor core 1-N. A zero denotes that the core is in an idle state, and a one denotes that the core is active. As shown, cores 2, 3, and 4 are active in this example, and cores 1 and 5 are idle. OCC 116 can read the status of each core from HCR $114_1$. OCC can use this status information to retrieve a count of the current number of active cores, and that count can be used to determine an operating frequency for the cores, as explained in further detail below.

HCR $114_2$ comprises an interlock that prevents a core from exiting an idle state until certain operating conditions have been met. In this example, a one indicates that the core is locked and cannot be powered on until firmware confirms that the operating frequency for the cores is at a safe level. A zero indicates that the core can exit the idle state. As shown, all cores are inhibited from changing state until a safe operating frequency is achieved. When a safe operating frequency is achieved (as described in further detail below), the cores are uninhibited and allowed to exit the idle state. After the cores that have a pending wakeup exit the idle state, the cores are reinhibited so that they do not exit the idle state in the future until an appropriate frequency has been set. Note that in general, when a core transitions from an active state to an idle state there is no danger of an overcurrent situation happening, like there is when a core transitions from an idle state to an active state.

HCR $114_3$ comprises a register that stores pending wakeup signals for the processor cores. A one indicates a pending wakeup signal, while a zero indicates no pending wakeup signal. In this example, the operating system has sent a signal to wake up core 5. Cores 2, 3, and 4 are already active, and core 1 has not been selected for wakeup. OCC 116 can poll HCR $114_3$ at regular intervals to determine if there are any pending wakeup signals. If there are pending wakeups, OCC 116 and associated firmware can begin the process of setting the frequency of the cores to a safe level. The cores pending wakeup will not exit the idle state until the frequency is at a safe level. In other embodiments, an interrupt may be used to indicate that a core is pending wakeup, instead of polling a register.

Numerous other hardware control registers may also be used in certain embodiments. For example, a hardware control register may be used to set the maximum frequency of each core. This register sets the frequency of the cores at a safe level, within the power limits of the chip. Another hardware control register may store the actual operating frequency for each core. This register may be read by an OCC to determine if the frequency has reached a safe level so that idle cores may exit the idle state.

Figure 3:
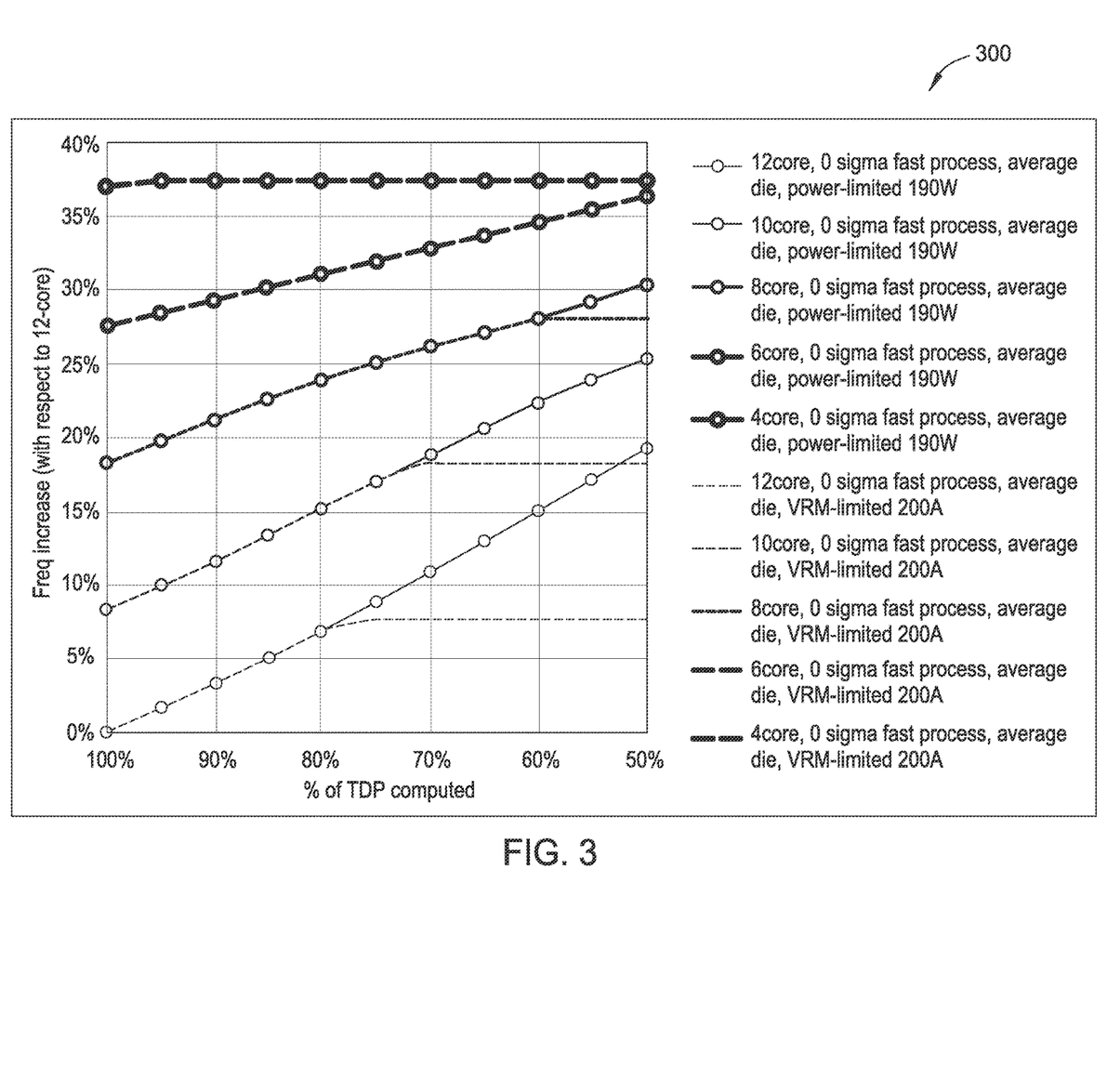
FIG. 3 illustrates an example frequency lookup table, according to one embodiment disclosed herein.

FIG. 3 illustrates an example frequency lookup table 300 (or frequency uplift table). This figure illustrates how frequency can be increased based on core count. In this example, a 12-core processor is used as a baseline, with all cores powered up, running the highest-power thermal design point (TDP) workload. The X-axis illustrates the switching current (also known as AC current) percentage, while running a specific workload, relative to the TDP workload. For example, the 90% point on the X-axis represents a workload that is 90% of the power of the TDP workload. The Y-axis illustrates the frequency boost relative to the nominal mode point. The nominal mode point corresponds to the 12-core processor, with all 12 cores running the TDP workload. The voltage-frequency combination for the nominal mode is stored in VPD.

Five groups of lines are illustrated in table 300, with each group corresponding to the number of cores that are powered on: 12, 10, 8, 6, or 4 cores. For each of the core counts there are two curves in table 300: one that corresponds to the unlimited voltage regulator capacity, and one that has an additional limitation on the frequency uplift imposed by the voltage regulator current limits.

The reduced core count configurations have a higher frequency than higher core count configurations, even with running the TDP workload. This is because the power of the power gated cores can be used by the running (active) cores, allowing the running cores to operate at a higher voltage and frequency. The voltage regulator (VRM) current limited frequency uplifts are also higher for configurations with reduced core count. In embodiments described herein, the power gated cores cannot be powered on without interlocking with the power management firmware. When receiving a request to power up a core (or multiple cores), the power management firmware reduces the voltage and frequency uplift to the levels that correspond to the requested configuration, before powering up the cores. This interlock guarantees that the voltage regulator current capacity will not be exceeded for any workload behavior.

In the example illustrated in FIG. 3, the voltage regulator has 200 Amps of current capacity. The frequency uplift for the 12-core configuration is limited to approximately 7.5% in this example, achieved at 80% of the dynamic power of the TDP workload. Any further reduction in the workload does not allow any additional frequency boost, because of the voltage regulator current limits. If there is a quick change in the workload, resulting in the maximum current consumption, the current will not exceed the 200 A limit.

Powering down two of the twelve cores allows the frequency to be boosted between 8% to 18%, depending on the workload activity. Powering down four of the twelve cores increases the frequency boosting opportunity to 18% for the most power-intensive workload. With the reduction in processor workload AC, the frequency boost potential for the 8-core configuration increases to 28%. For the 8-core configuration, the limited voltage regulator capacity only limits the frequency boost potential by 2% (as seen along the right edge of the graph). For the six and four-core configurations the limited voltage capacity does not have any impact on the frequency boosting opportunity. For the four-core configuration, a nearly maximum frequency boost is achieved even for the power-heavy workload. Any reduction in the utilization of the running cores allows for only 1% of additional frequency boosting in this example.

The frequency boosting for any of the scenarios is limited to about 38% in this example, because of the limitations on maximum voltage ($V_{MAX}$). For configurations running into the $V_{MAX}$ limitation, the processor voltage is set at $V_{MAX}$, and the frequency is set accordingly. Any further reduction of the workload activity or the core count is inconsequential to the frequency.

As seen in FIG. 3, significant frequency boosts can be obtained when cores are powered down. These frequency boosts illustrate the usefulness of the interlock, to safely transition the cores to a lower frequency as cores exit the idle state.

Figure 4:
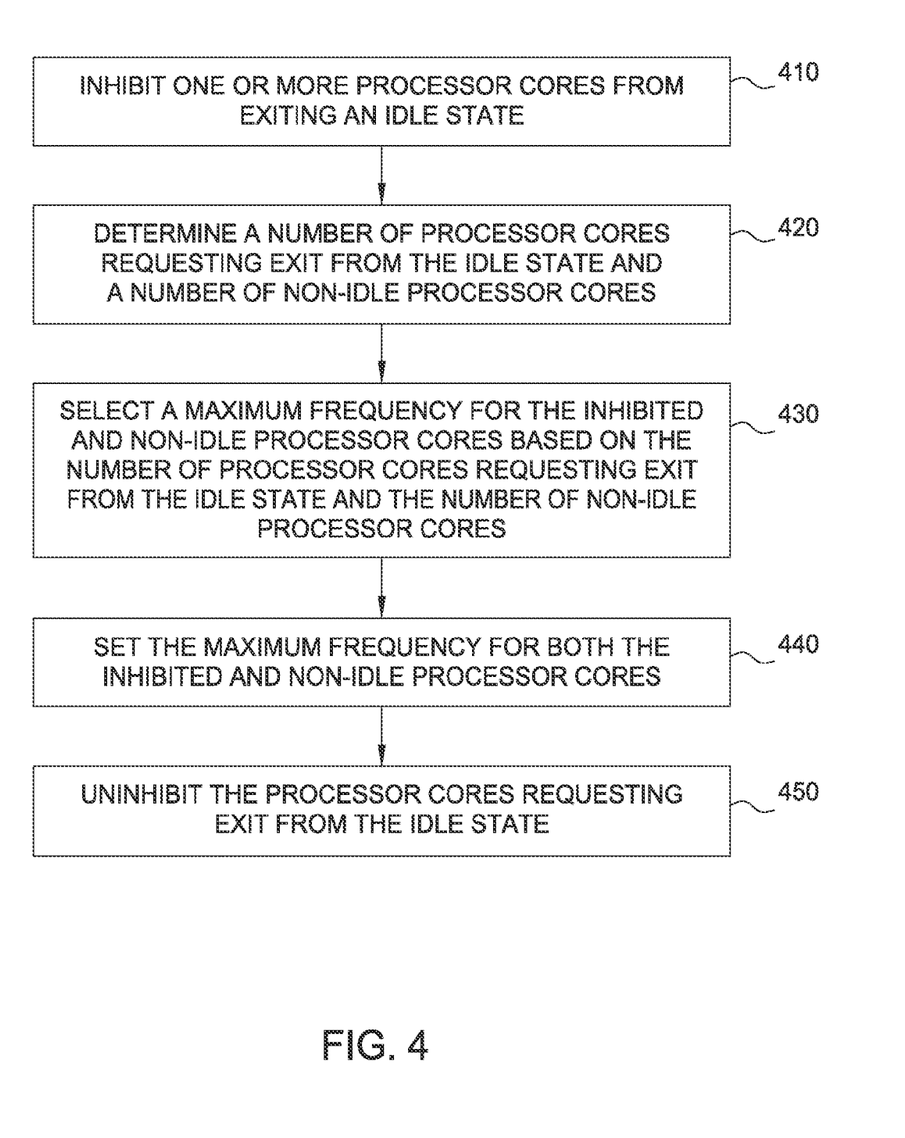
FIG. 4 illustrates a flowchart of a method for adjusting a frequency of a processor, according to one embodiment disclosed herein.

FIG. 4 is a flowchart of a method for adjusting a frequency of a processor. Although the method steps are described in conjunction with the systems of FIGS. 1-3, persons skilled in the art will understand that any system configured to perform the method steps, in any order, falls within the scope of the present invention. In various embodiments, the hardware and/or software elements described above in FIGS. 1-3 can be configured to perform the method steps of FIG. 4. In some embodiments, an OCC 116 illustrated in FIG. 1 can perform some or all of the steps in FIG. 4 by executing logic embodied in firmware.

As shown, a method 400 begins at step 410 where one or more processor cores are inhibited from exiting an idle state. An interlock may be used to inhibit the cores. As one example described above with respect to FIG. 2, a bit may be set in a control register to denote that a core is inhibited from exiting the idle state until certain operating conditions are met.

At step 420, the number of processor cores requesting exit from the idle state is determined, along with a count of the number of non-idle processor cores. Hardware control registers may also be used in this step. An OCC may operate firmware that polls a register at regular intervals to determine if any cores are requesting exit from an idle state, and if so, how many. The firmware may also read a register to determine the number of non-idle (active) processor cores. The sum of these two numbers provides a maximum count of cores that will be active when the idle cores exit the idle state. It is possible that the active core count will actually be lower than this maximum count after the idle cores exit the idle state, if an active core is shut down before the idle exit occurs.

In other embodiments, a state of the idle cores can also be determined. The state of the idle cores may be used to more finely tune the frequency adjustment. That is, different cores may be in different idle states, and different idle states may have different levels of power consumption. For example, some idle states may be power-gated and some idle states may be non-power-gated. As another example, some idle states may have more or less cache memory powered off than other idle states. Knowledge of how many cores are in each of the different idle states can allow for more precise selection of a maximum frequency for the cores. One example technique for doing so is to use different frequency lookup tables based on the states of the idle cores.

At step 430, a maximum frequency is selected for the inhibited and non-idle processor cores based on the number of inhibited processor cores requesting exit from the idle state and the number of non-idle processor cores. The maximum frequency is selected to be a safe frequency for the number of cores that will be active after the idle cores exit the idle state. Any suitable method may be used to select this maximum frequency. For example, a lookup table may be used to select the frequency based on the core count and/or other parameters. As discussed above, a lower frequency is needed when the core count goes up to prevent overcurrent situations. As also discussed above, in other embodiments the state of the idle cores may also be used for a more precise selection of a maximum frequency.

At step 440, the firmware sets the maximum frequency for both the inhibited and the non-idle processor cores. This frequency may be set in a hardware control register or by using any other suitable method. As one example, setting a maximum frequency could be done by setting a value in a core frequency register at or below the maximum frequency. The core frequency register sets the frequency for a core. The core frequency register may be a hardware control register in some embodiments. Another technique for setting a maximum frequency is to use a frequency clipping register. This register may also be a hardware control register. The frequency clipping register can be used to override the core frequency register, by setting a maximum frequency clip value. Frequencies of cores are reduced to a value below the maximum frequency clip value if the frequency exceeds the maximum frequency clip value stored in the frequency clipping register.

In some embodiments, a voltage can also be adjusted or set for the inhibited and non-idle cores along with the frequency in this step. A lookup table may be used to determine a voltage-frequency pair for safe operation. Separate tables may be utilized that provide voltage and frequency values for each number of active cores. These tables can be stored in firmware or any suitable storage. Interpolation may be used between values stored in the tables to determine appropriate frequency and/or voltage values. If frequency is being raised, voltage may be raised to support that frequency. If frequency is being lowered, the voltage may also be lowered to save power. If the frequency of a core does not change because it is already below the maximum frequency, the voltage could be adjusted to save energy. Methods other than a lookup table could also be used for determining a voltage-frequency pair.

At step 450, the processor cores requesting exit from the idle state are uninhibited and begin active operation. The frequency should now be at a safe level that prevents overcurrent situations. In some embodiments, firmware can wait to uninhibit the cores until it is determined that the frequency limit has been enforced. That is, the firmware can read a control register that stores the actual frequency of active processor cores and wait until that actual frequency is below the maximum frequency before uninhibiting the processor cores. This provides a check that the maximum frequency is being enforced before proceeding with wakeup. If the voltage was also adjusted, the firmware can also check that the voltage limits are being enforced before proceeding with wakeup.

After the idle cores exit the idle state, the interlock can be reinhibited for all the cores. Bits can be set in the hardware control register that functions as the interlock to inhibit idle exit once again. At that point, the system is ready to perform the method again when another core requests idle exit.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for adjusting a frequency of a multi-core processor, comprising:
    inhibiting one or more processor cores from exiting an idle state;
    determining, with a controller, a number of processor cores requesting exit from the idle state and a number of non-idle processor cores;
    selecting a maximum frequency for the inhibited and non-idle processor cores based on the number of inhibited processor cores requesting exit from the idle state and the number of non-idle processor cores;
    setting, with the controller, the maximum frequency for both the inhibited and the non-idle processor cores; and
    uninhibiting the processor cores requesting exit from the idle state.

2. The method of claim 1, wherein inhibiting one or more processor cores from exiting an idle state further comprises setting a status in a control register.

3. The method of claim 1, wherein determining a number of processor cores requesting exit from the idle state and a number of non-idle processor cores further comprises inspecting a status for each processor core in a control register.

4. The method of claim 1, further comprising, before uninhibiting the processor cores, adjusting a voltage for each of the processor cores.

5. The method of claim 4, wherein adjusting the voltage is based at least in part on the frequency and the total number of inhibited processor cores requesting exit from the idle state plus the number of non-idle processor cores.

6. The method of claim 1, further comprising, before uninhibiting the processor cores requesting exit from the idle state, determining that the frequency for each of the non-idle processor cores is at or below the maximum frequency.

7. The method of claim 1, further comprising, after uninhibiting the processor cores, re-inhibiting one or more idle processor cores from exiting an idle state.

8. The method of claim 1, wherein setting the maximum frequency further comprises setting a frequency clipping register that sets the maximum frequency for one or more cores.

9. The method of claim 1, wherein selecting a maximum frequency for the inhibited and non-idle processor cores is further based on a state of one or more of the inhibited processor cores.

* * * * *